United States Patent [19]
Schmidt et al.

[11] Patent Number: 5,538,537
[45] Date of Patent: Jul. 23, 1996

[54] METHOD OF PURIFYING FLUE GASES

[75] Inventors: Michael Schmidt, Beckum; Detlev Kupper, Telgte; Jürgen Schneberger, Ennigerloh, all of Germany

[73] Assignee: Krupp Polysius AG, Beckum, Germany

[21] Appl. No.: 368,037

[22] Filed: Jan. 3, 1995

[30] Foreign Application Priority Data

Jan. 17, 1994 [DE] Germany .................. 44 01 166.03

[51] Int. Cl.$^6$ .............. B01D 53/04; B01D 53/08
[52] U.S. Cl. ................ 95/107; 95/137; 95/900; 95/901
[58] Field of Search ............... 95/107, 135–137, 95/900, 901; 423/244.01, 244.07, 244.08

[56] References Cited

U.S. PATENT DOCUMENTS

| | | | |
|---|---|---|---|
| 1,481,221 | 1/1924 | Nuss ................................... | 95/107 |
| 3,345,125 | 10/1967 | Kruel et al. ...................... | 95/137 X |
| 3,405,508 | 10/1968 | Peters et al. ..................... | 95/137 X |
| 3,505,008 | 4/1970 | Frevel et al. ..................... | 95/137 X |
| 3,563,704 | 2/1971 | Torrence ........................... | 95/137 X |
| 3,589,863 | 6/1971 | Frevel et al. ..................... | 95/137 X |
| 3,772,854 | 11/1973 | Tamura et al. .................... | 95/137 |
| 3,928,005 | 12/1975 | Laslo ................................. | 95/137 X |
| 4,049,462 | 9/1977 | Cocozza ........................... | 423/244.07 X |
| 4,061,476 | 12/1977 | Hölter et al. ..................... | 95/137 X |
| 4,450,777 | 5/1984 | Wolfrum et al. ................. | 95/137 X |
| 4,470,850 | 9/1984 | Bloss ................................. | 423/244.07 X |
| 4,634,583 | 1/1987 | Wolter et al. .................... | 423/244.08 X |

FOREIGN PATENT DOCUMENTS

| | | | |
|---|---|---|---|
| 1221674 | 5/1987 | Canada ............................. | 423/244.07 |
| 0260229 | 9/1988 | Germany ......................... | 423/244.07 |
| 52-032001 | 3/1977 | Japan ................................ | 423/244.07 |
| 52-050985 | 4/1977 | Japan ................................ | 95/137 |
| 57-207531 | 12/1982 | Japan ................................ | 95/136 |
| 1699551 | 12/1991 | U.S.S.R. ........................... | 423/244.07 |
| 1291933 | 10/1972 | United Kingdom .............. | 95/137 |
| 2152487 | 8/1985 | United Kingdom .............. | 423/244.07 |

OTHER PUBLICATIONS

"Zement–Kalk–Gips" No. 12/1985, p. 739.

*Primary Examiner*—Robert Spitzer
*Attorney, Agent, or Firm*—Learman & McCulloch

[57] ABSTRACT

A method of desulphurizing flue gases polluted with $SO_2$ comprising cooling the gases to a temperature of about 0.5 to 20° above the dew point of the gases and flowing the gases through a granular sorbent prepared from a mixture of commercial cement and water.

20 Claims, 1 Drawing Sheet

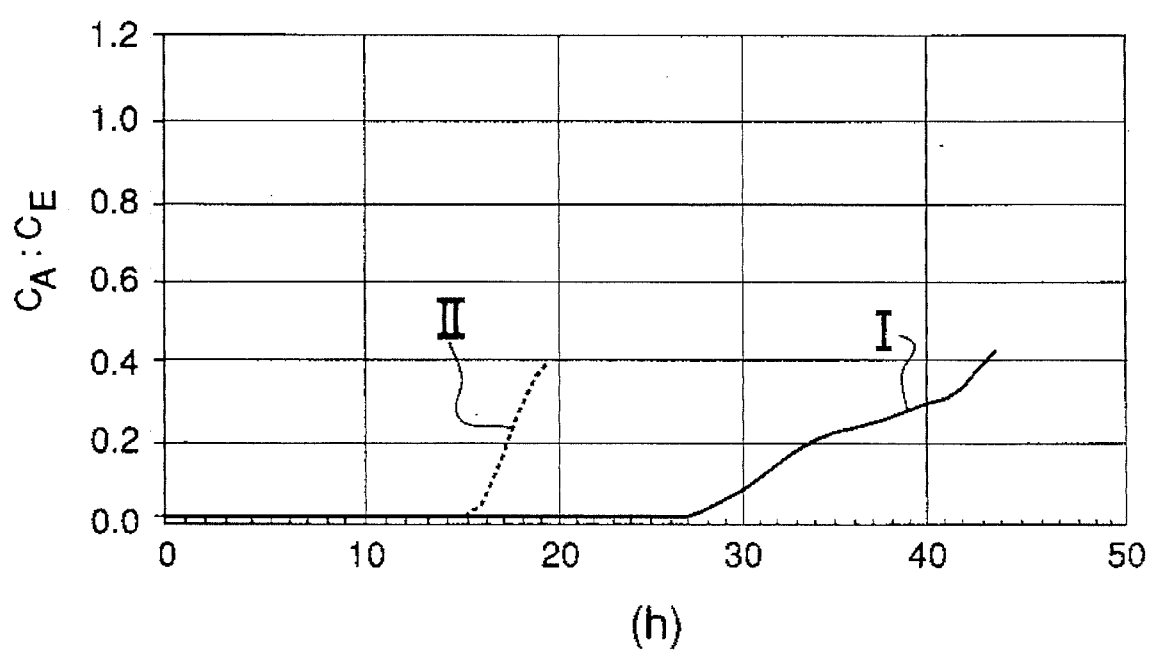

5,538,537

METHOD OF PURIFYING FLUE GASES

The invention relates to a method of purifying flue gases laden with pollutants, particularly $SO_2$, in which these flue gases are brought into contact with a sorbent.

BACKGROUND OF THE INVENTION

In general various methods of purifying flue gases from large or industrial furnace installations are already known in the art. With these methods various pollutants can be removed from the flue gases, particularly with the aid of adsorption agents such as for example activated charcoal, activated coke or the like.

A proposal can also be found from the periodical ZEMENT-KALK-GIPS, No. 12/1985, page 739, according to which the sulphur dioxide contained in the flue gases of steam power stations operated with fossil fuels are to be bound and removed from the flue gases by feeding portland cement directly into the steam boiler furnace. This type of flue gas desulphurisation only functions at the relatively high burning temperatures which prevail in the furnaces, which from various points of view (e.g. stress on the input means, handling, etc.) is a disadvantage.

The object of the invention is to provide a method by which with relatively simple and readily available means at least a reliable desulphurisation of the exit gases coming in particular from industrial furnace installations can be achieved.

SUMMARY OF THE INVENTION

In this method according to the invention for purifying flue gases laden with pollutants, particularly $SO_2$, a sot bent is used which consists at least for the most part of granular cement stone which is produced by mixing at least a commercial cement with water. This sorbent is brought into contact with the flue gases at a predetermined temperature, and the flue gases are adjusted i.e. cooled by the injection of water to a temperature slightly above the dew point temperature of these flue gases.

This cement stone, which is preferably present in the form of fine grains to small pieces, can be brought as sorbent into contact in a relatively simple manner with the flue gases to be purified, for example by having the flue gases flow through a sufficiently large or thick bed of this sorbent. Due to this contact at least the sulphur dioxide contained in the flue gases is very effectively removed therefrom; however, in general other pollutants can also be at least partially removed from the flue gases by means of this sorbent used according to the invention.

In a relatively simple manner the sorbent used according to the invention can be produced extremely simply with universally available commercial cement (e.g. portland cement, iron portland cement, blast furnace cement or the like) as principal starting material. Basically above all with relatively simple purifying processes the sorbent used according to the invention can consist solely and exclusively of granulated cement stone which is merely produced by mixing at least a commercial cement with water (and corresponding hardening). Thus this is a readily available material which can be produced extremely simply and economically.

Sorbent laden with pollutants from the flue gases can be further processed directly in an extremely advantageous manner in a cement factory, for example by grinding it together with cement clinker or separately therefrom and thereby adding it as a component, for example as a gypsum component, to a cement which is to be produced, so that no disposal problems exist for sot bent laden with pollutant.

By the injection of water into the flue gases the latter are set to a predetermined temperature at which the sorbent is particularly favourably brought into contact with the flue gases to be purified; by this injection of water the flue gases should be set to a temperature above their dew point temperature, and in a preferred mode of operation this temperature lies approximately 0.5° to 20° C. above the dew point temperature of the flue gases. The moisture content of the flue gases is also simultaneously set in an advantageous manner by this finely dispersed addition of water.

In this method of purification according to the invention it is also particularly advantageous that because of the production and the use of the sorbent neither a waste substance which has to be disposed of nor an undesirable effluent is produced, since the water required for setting the flue gas temperature can be moved in the circuit and after the purification of the flue gases the sorbent can be used—as already indicated—in the cement industry in the grinding of clinker.

THE DRAWINGS

The single drawing figure is a graph showing the ratio of $SO_2$ in the flue gases before and after purification.

DETAILED DESCRIPTION

In this method according to the invention, for the production of the cement stone cement is mixed with water in a predetermined water/cement ratio of preferably approximately 0.05 to 0.4, i.e. the ratio of water: cement is preferably 1:20 to 1:2.5.

The cement stone which is used for formation of the sorbent to be used according to the invention can basically be produced in any suitable and convenient manner as well as with the grain size which appears most favourable.

According to a preferred manner of proceeding the cement stone used for the sorbent can be produced in that the water/cement mixture—for example in a generally usual mortar consistency—is shaped into at least one relatively large block, this block of cement stone is hardened or solidified with a storage time of approximately 1 to 7 days and then the cement stone block is broken into grains or small pieces.

Another possibility for producing the granular cement stone is produced in that the water/cement mixture—approximately with a corresponding mortar-like consistency—is shaped in a suitable granulating device (e.g. granulating pan) into granules of the desired size and the granules are then hardened with a predetermined storage time to form cement stone granules.

In order to reinforce the purifying effect of the sorbent to be used according to the invention it may also be advantageous if this sorbent is produced with a predetermined pore radius distribution or pore structure. There are a number of possibilities for this, which are applied as required or also at least in partial combination. This pore radius distribution can advantageously be controlled by the addition of granular additives, such as for example tailings from a cement grinding plant, bypass dust from a cement kiln installation, precalcined cement raw meal or coal furnace ashes (in particular ashes from fluosolids furnaces or the like) or by the addition of an agent forming air voids or foam or by a corresponding adjustment of water-cement ratio mentioned above.

Moreover the sorption properties of the granulated cement stone can be further influenced in that the granulated cement stone to be used as sorbent is produced with a predetermined calcium hydroxide content. This calcium hydroxide content is advantageously adjusted or controlled by the aforementioned water/cement ratio and/or the storage time for hardening the cement stone and/or the addition of bypass dust from a cement kiln installation, precalcined cement raw meal or coal furnace ashes, and these possibilities for influencing or addition can be undertaken individually or also in appropriate combination of several possibilities or substances.

With regard to a particularly favourable sorption effect the sorbent can be used—in adaptation to the particular flue gases to be purified—if required both with a predetermined pore structure and also with a predetermined calcium hydroxide content, and then the pore structure and the calcium hydroxide content are advantageously linked with one another in the production of the sot bent or of the granulated cement stone.

With regard to the previously described possibilities for adjustment of the pore structure and calcium hydroxide content it should also be mentioned that with the addition of ashes or fly ashes from coal or fluosolids furnaces (particularly so-called ZWS or cement works ashes) a particularly environment-friendly means for disposal of these ashes can be achieved simultaneously if a sorbent laden with pollutants from the flue gases is further processed for the production of cement (together with cement clinker).

It will further be generally advantageous to give the sorbent used according to the invention a predetermined strength or minimum strength, which contributes to a particularly reliable and constant stratification and possibility for the sorbent to flow through it. The sorbent or the granular cement stone used therefor can be adjusted in its strength or hardness by a corresponding water/cement ratio and/or by the storage time for hardening the cement stone and/or by the quantity and type of at least one additive, in which case the same substances can be used as additives as were referred to above as additives for the adjustment of the pore radius distribution and the calcium hydroxide content.

Regardless of the way in which the sorbent is produced, it is advantageous to use it with a grain size of >1 mm, preferably approximately 4 to 20 mm. In this way a further possibility is produced for adapting the construction and action of sorbent beds or layers to the flue gases to be purified, i.e. the contact time of the flue gases to be purified with the sorbent can be influenced by the choice of the grain size for the sorbent. Thus as a rule the sorbent is approximately in fine grains to pieces, particularly small pieces.

In those cases in which, apart from an effective desulphurisation, a more far-reaching and reliable removal of other pollutants from the flue gases is also desired, a proportion of carbonaceous granular sorption material, which can be above all an activated charcoal, activated coke or hearth furnace coke which is produced in a manner which is known per se and specially aged (used in a particular state of ageing), can also be added to the granulated cement stone. In this case this mixture of granulated cement stone and carbonaceous sorption material then forms the sorbent used according to the invention which is brought into contact with flue gases which are to be purified. Also in this case it will be advantageous for the carbonaceous sorption material used to be co-ordinated in its grain size or size of lumps with the grain size composition of the cement stone or to adapt it to this cement stone. Thus by this sot bent mixture according to the invention the possibility is created of effectively removing other pollutants, such as for example heavy metals or heavy metal components, $NH_x$ or the like, from the flue gases in addition to a reliable desulphurisation of the pollutant-laden flue gases.

In general this method according to the invention can be used for purifying flue gases from large and industrial furnace installations or the like, and it can be adapted to the particular applications in an extremely advantageous manner with a high degree of efficiency. A particularly advantageous application of this method according to the invention is in the production of cement or the like, i.e. above all in the purification of exit gases from the kiln installations used there, and here—considered in the direction of flow of the flue gases—preferably behind the filter arrangements, such as for example electrofilters, which are usually used. In this context it will be particularly advantageous if the sorbent is at least partially produced in the same works in which it is also to be used, at least to some extent. This relates quite particularly to the production of granular cement stone.

Precisely in the application of the method according to the invention to kiln installations for the production of cement or the like a further advantage is provided in that practically no disposal problems or environmental problems occur in the disposal of pollutant-laden sorbent, since in fact pollutant-laden sorbent can for example be delivered to a cement grinding plant and can there be ground together with cement clinker to make cement and mixed in the usual way. In this way used or pollutant-laden sorbent is bound into the finished cement without environmental problems occurring.

In the practical implementation of the method of flue gas purification according to the invention the pollutant-laden flue gases can be brought into contact with the sorbent in any suitable manner. Above all the following practical possibilities present themselves for this purpose:

a) this sorbent used according to the invention, in the form of a travelling bed which moves substantially vertically, has the pollutant-laden flue gases flowing through it;

b) this sorbent used according to the invention, in the form of a travelling bed which moves substantially horizontally, for example on a travelling grate, has the pollutant-laden flue gases flowing through it in the transverse direction (according to the cross-flow principle), and the sorbent can be delivered for example by way of a storage bin to the travelling grate, the feed speed of which is variable as is the height of the sorbent bed, which latter can be approximately from 30 to 70 cm.

This method according to the invention can be carried out with flue gas flow speeds of approximately 0.3 to 2 m/s.

Finally, two further examples may be given to explain how the sorbent can be used according to the present invention. These examples may be explained with the aid of the graph of FIG. 1 in which the ratio of the $SO_2$ concentration in the flue gas to be purified is shown before and after flowing through the sorbent as a function of the sorption time (treatment time). In this graph the sorption time or operating time is given in hours (h) in the abscissa, whilst the concentration ratio of the $SO_2$ is plotted in the ordinate, and in fact the $SO_2$ concentration of the purified flue gas after coming into contact with the sorbent ($=C_A$) is shown in relation to the $SO_2$ concentration of the flue gas which is laden with pollutants or to be purified before being brought into contact with the sorbent ($=C_E$).

In both examples according to the curves I and II a pollutant-laden exit gas from a rotary kiln installation for the production of cement was purified as flue gas, and in fact this purification took place after the exit gas had passed through an associated electrofilter installation. In both experimental examples substantially pure granulated cement stone was used as sorbent. Furthermore in both examples equally pollutant-laden exit gas was brought into contact with the sorbent or purified, i.e. in both examples the starting concentration of $SO_2$, i.e. the value $C_E$, was 1500 mg/Nm³. The two examples of applications according to the curves I and II in the graph differ from one another only in the sorption or operating temperatures at which the exit gas/flue gas to be purified has been brought into contact with the sorbent.

In the case of Example I the sorption or operating temperature of the flue gas on contact with the sorbent was 4.4° C. above the dew point temperature, whilst in the case of example II the sorption or operating temperature of the exit gas was 10.4° C. above the dew point temperature.

With the aid of the two curves of examples I and II in the graph it can be readily recognised that the ratio of the $SO_2$ concentration in the flue gas after the flue gas has passed through the sorbent in comparison with before the flue gas has passed through the sorbent (that is to say the ratio $C_A$: $C_E$) is regarded as a function of the time (contact time between flue gas and sorbent).

We claim:

1. A method of desulphurising furnace flue gases laden with $SO_2$ comprising:

cooling the flue gases to a temperature near but above the dew point thereof; and flowing the cooled flue gases through a bed of granular cement stone sorbent prepared from a mixture of cement and water.

2. The method of claim 1 wherein the mixture comprises a water to cement ratio of about 0.05 to 0.4.

3. The method of claim 2 wherein the sorbent is prepared by shaping the mixture into a block, hardening the block, and then breaking the block into granular cement stone fragments.

4. The method of claim 2 wherein the sorbent is prepared by shaping the mixture into discrete granules and hardening the granules.

5. The method of claim 2 wherein the sorbent as prepared has a predetermined pore radius distribution.

6. The method of claim 5 including controlling the pore radius distribution by a method step selected from a group of steps consisting essentially of: adding tailings to the mixture from a cement grinding plant, adding bypass dust to the mixture from a cement kiln installation, adding precalcined cement raw meal to the mixture, adding coal furnace ash to the mixture, adding an air-forming agent to the mixture, adding foam material to the mixture, and adjusting the water to cement ratio of the mixture.

7. The method of claim 2 wherein the sorbent has a predetermined calcium hydroxide content.

8. The method of claim 7 including controlling the calcium hydroxide content by a method step selected from a group of steps consisting essentially of: adjusting the water to cement ratio of the mixture, adjusting the hardening cycle of the mixture, adding bypass dust from a cement kiln installation to the mixture, adding precalcined cement raw meal to the mixture, and adding coal furnace ash to the mixture.

9. The method of claim 2 wherein the sorbent has a predetermined pore radius distribution and a predetermined calcium hydroxide content.

10. The method of claim 2 wherein the sorbent has a predetermined strength and controlling the strength by a method step selected from a group of steps consisting essentially of: adjusting the water to cement ratio of the mixture, adjusting the hardening cycle of the mixture, and adding a strengthening agent to the mixture.

11. The method of claim 1, wherein the sorbent has a grain size >1 mm.

12. The method of claim 11, wherein the sorbent has a grain size of about 4 to 20 mm.

13. The method of claim 1 including combining carbonaceous granular sorption material with the granular cement stone sorbent, and wherein the carbonaceous material is selected from a group consisting essentially of activated charcoal, activated coke, and hearth furnace ash.

14. The method of claim 1 wherein the flue gases are cooled to a temperature about 0.5° to 20° C. above their dew point.

15. The method of claim 1 including moving said bed substantially horizontally and flowing said flue gases substantially vertically through said bed.

16. The method of claim 1 including moving said bed substantially vertically and flowing the flue gases substantially horizontally through the bed.

17. The method of claim 1 including introducing water into the flue gases to cool said gases to the predetermined temperature.

18. A method of desulphurising furnace flue gases laden with $SO_2$ comprising:

cooling the flue gases to a temperature below their combustion temperature and above their dew point; and flowing the cooled flue gases through a bed of granular cement stone sorbent prepared from a mixture of water and cement.

19. The method of claim 18 wherein said flue gases are cooled to a temperature of about 0.5° to 20° C. above their dew point.

20. A method of desulphurising furnace flue gases laden with $SO_2$ pollutants comprising the steps of:

cooling the temperature of the flue gases to a predetermined level about 0.5° to 20° C. above their dew point; and flowing the cooled flue gases through a granular cement stone sorbent prepared from a mixture of water and cement.

* * * * *

UNITED STATES PATENT AND TRADEMARK OFFICE
CERTIFICATE OF CORRECTION

PATENT NO. : 5,538,537
DATED : July 23, 1996
INVENTOR(S) : Michael Schmidt, Detlev Kupper, Jurgen Schneberger It is certified that error appears in the above-indentified patent and that said Letters Patent is hereby corrected as shown below:

Column 1, line 34, change "sot bent" to -- sorbent --.

Column 2, line 4, change "sot bent" to -- sorbent --.

Column 3, line 22, change "sot bent" to -- sorbent --.

Column 4, line 3, change "sot bent" to -- sorbent --.

Column 5, line 18, change "sot bent" to -- sorbent --.

Signed and Sealed this

Fifteenth Day of October, 1996

*Attest:*

BRUCE LEHMAN

*Attesting Officer*   *Commissioner of Patents and Trademarks*